United States Patent Office 3,481,203
Patented Dec. 2, 1969

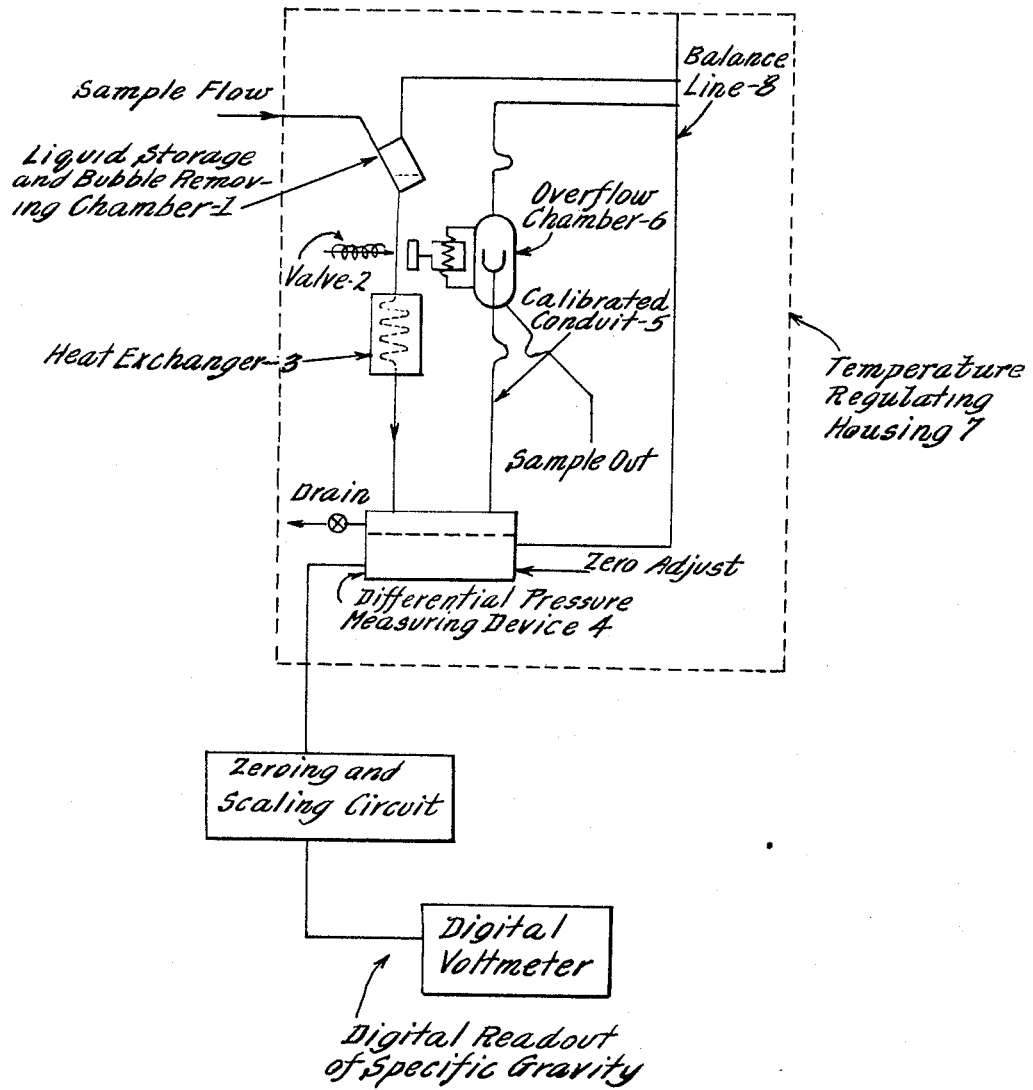

3,481,203
DENSITY MEASURING APPARATUS
Carl D. Ackerman, Indiana Township, Allegheny County, and John K. Hill, O'Hara Township, Allegheny County, Pa., assignors to Gulf Research & Development Company, Pittsburgh, Pa., a corporation of Delaware
Filed Feb. 17, 1966, Ser. No. 528,172
Int. Cl. G01n 9/12, 9/00; G01f 23/00
U.S. Cl. 73—438
10 Claims

ABSTRACT OF THE DISCLOSURE

Method and apparatus for measuring the density of a liquid stream flowing at a rate of less than about 1000 ml./hr., which method and apparatus eliminate erroneous readings which might be caused by viscous drag.

---

This invention relates to a method and apparatus for measuring the density of a liquid stream of small volume flow rate.

Often in small scale pilot plant and automation studies, frequent periodic measurements of density of streams of small volume flow rates are needed. However, no density measuring apparatus is commercially available for frequent accurate measurement of streams with flows of less than 1,000 milliliters per hour, as for example in connection with pilot plant operations as distinguished from larger scale commercial operations. Present devices have such a large internal volume that the time required to fill the apparatus makes frequent measurement impossible with streams having small volume flow rates. Also, when the internal volume of a continuous density measuring device of the prior art is reduced by reducing the internal diameter of the piping and conduit, the friction of the liquid flowing through the conduit causes a pressure variance across the column of liquid in the calibrated conduit. This friction pressure drop cannot always be conveniently compensated when frequent measurement of density of small volume flow liquid streams are necessary. Thus, the large internal volume of present devices and the friction pressure drop of devices modified to a small internal diameter makes frequent or automatic density measurement of liquid streams of small flow rates very difficult.

The present invention provides an improved method and apparatus for accurately measuring density of small volume flow liquid streams, without the adverse effect of friction pressure drop across the column of liquid being measured. Such an improved apparatus has its most essential elements formed by small diameter piping, a small diameter calibrated conduit, a differential pressure measuring device of small internal volume to permit frequent density measurements of liquid streams with small volume flow rates, by heat exchange means for controlling the temperature of the liquid, by means such as a valve to interrupt flow of the liquid through the calibrated conduit, and by means to store accumulated liquid when flow is stopped through the calibrated conduit.

As briefly indicated above, in order that the herein described device will be capable of measuring the density of a fluid that is reasonably representative of the fluid currently comprising the flowing stream, at any given time, as opposed to the density of a fluid that is representative of the average fluid composition forming the flowing stream over a long period of time, it is important that the liquid internal volume of the apparatus, i.e., the heat exchanger, the differential pressure cell, the calibrated sample conduit, and the part of the liquid storage device occupied by liquid, be such that the liquid contained in the apparatus be replaced completely at intervals more frequent than those at which appreciable changes in the density of the flowing stream occur. By way of illustration, where the flowing stream is a catalytically hydrogenated hydrocarbon liquid and the flow rate of the stream is 500 ml. per hour, the total internal volume of the apparatus should not exceed about 500 ml. and preferably should not exceed about 250 ml.

The limitation on the internal volume of the apparatus in turn imposes a practical maximum limtation on the internal volume of the sample conduit. This limitation in turn imposes a maximum limit on the internal diameter of the sample conduit. As a result, in the absence of the flow interrupting means provided for in accordance with this invention, there is created a pressure drop across the sample conduit due to frictional drag of the flowing liquid, which pressure drop affects the accuracy of the pressure measurement by the differential pressure cell. The specific internal diameter of the sample conduit at which a problem due to frictional drag of liquid occurs will vary with the flow rate of the liquid and the nature of the liquid itself. When the flow rate of the flowing stream is 1000 ml. per hour or less and the stream is formed of a catalytically hydrogenated hydrocarbon oil having a viscosity up to 3000 SUS at 100° F., such a problem will occur when the internal diameter of the sample conduit is less than about 0.25 inch.

In greater detail, the apparatus of our invention includes a liquid storage and bubble removing chamber to receive the liquid stream, to store the liquid stream during interruption of flow, and to remove bubbles from the liquid. A valve or equivalent means of interrupting the flow at intervals is provided in the piping below the storage and bubble removing chamber. A heat exchanger, such as a coil running through an external heat-exchanger medium, is connected by piping or other similar means to the flow interrupting means or valve. This heat exchanger is in communication with a differential pressure measuring device, such as a differential pressure cell. The differential pressure measuring device also communicates with a calibrated conduit, which can be in either an upright or inclined position. The conduit is precisely calibrated to a specific predetermined height, so that, as liquid rises through the conduit and overflows, it will maintain a column of liquid of a known height. The open top of the calibrated conduit is located within an overflow chamber, from which the liquid stream leaves the apparatus. The external pressure is made equal across the top and bottom of the calibrated conduit with appropriate piping. Essential portions of the apparatus are enclosed within a temperature-regulating housing.

In operation, the liquid stream flows through the apparatus as described above, coming in at the liquid storage and bubble removing chamber, through the valve, heat exchanger, differential pressure measuring device, calibrated conduit, and out through overflow chamber. When the density of liquid stream is measured, the valve is shut and the liquid stream accumulates in the liquid storage and bubble removing chamber. Thus, flow is stopped through the apparatus but a sample of the liquid stream remains in the apparatus. The sample in the calibrated conduit is then measured for density. Density is determined by measuring the difference in pressure across the height of the static column of liquid in the upright calibrated conduit. Since temperature of the apparatus and pressure across the calibrated conduit are kept constant, the difference in pressure across this static column of liquid is proportional to the weight of the liquid. Specific gravity is determined by comparing the weight of the sample of the stream liquid in the calibrated conduit with the weight of a liquid of known density in the same calibrated conduit, which has been measured earlier.

FIGURE 1 is a schematic diagram showing a specific embodiment of the density measuring apparatus of this invention.

Referring to the diagram in FIGURE 1 a flowing liquid enters the apparatus and flows into the liquid storage and bubble removing chamber 1, then through piping to valve 2, through piping to heat exchanger 3, through piping into differential pressure measuring device 4, and into calibrated conduit 5, then into overflow chamber 6, and on through piping out of the apparatus. The entire apparatus is enclosed in a temperature regulating housing 7 to maintain a constant temperature for accurate readings. Balance line 8 connects the low-pressure side of the differential pressure-measuring device to the gas space above the calibrated conduit, thus balancing the external pressure across the calibrated conduit.

The liquid storage and bubble removing chamber serves a dual purpose, first to remove bubbles, which if present in the calibrated conduit could cause a false density reading, and second, to furnish a storage tank for the fluid to back up into when valve 2 is closed for purposes of making the static density measurement.

The valve 2 must be closed and the system allowed to stabilize before precise readings may be taken. This valve may be any means of interrupting flow momentarily. A solenoid valve works very well. The valve may be closed as long as one minute for small units, but liquid storage and bubble removing chamber is of sufficient volume to contain the entire flow from the experimental or pilot plant unit during this period. The time the valve is closed may vary between two seconds and two minutes.

The heat exchanger 3 is necessary to maintain constant temperature of the liquid stream. Any device, such as a coil or finned pipe, is adequate as long as it has a great enough surface area to permit sufficient heat to be transferred from the surrounding medium through the heat exchanger to heat or cool the liquid stream to the desired predetermined constant temperature.

The differential pressure measuring device 4 measures the pressure difference across the column of liquid in the calibrated conduit 5.

This device can be any apparatus commonly used to measure a pressure difference, but it must have a small internal volume where the liquid fills it. A specially modified conventional differential pressure cell has been found to work well. This cell was modified by reversing the high pressure side to the low pressure side of the cell by reversing the electrical circuit hookup. Then the internal volume of the new high pressure side was partially filled with a low temperature melting alloy and the alloy was machined to close tolerances. Other materials can be used to partially fill the apparatus. This modification can be used to reduce internal volume, i.e., holdup of the liquid stream, in the differential pressure cell to as low as 1.5 milliliter, yet action of the cell is not impaired.

The differential pressure cell is furnished with a zeroing and scaling circuit with digital voltmeter shown in FIGURE 1. The differential pressure cell also is equipped with a drain and with an adjustment device to zero the cell when empty.

The calibrated conduit is formed from a length of tubing of small diameter, and therefore small volume, i.e., sufficiently small as to permit frequent density measurement. The optimum diameter of the calibrated conduit will vary with the desired frequency of density measurement, and the flow rate of the liquid stream. Excellent results have been obtained with a calibrated conduit having a length of 25 inches, and inner diameter of 0.040 inch, taking a density measurement once each hour at flow rate of 15 cc./hour, but calibrated conduit of an inner diameter of between about 0.02 and 0.06 inch is used.

The overflow chamber 6 conducts the liquid stream out of the apparatus after the liquid flows over the top of the calibrated conduit.

A level adjustment device on the overflow chamber is essential for precise calibration if no electrical scaling is available. If electrical scaling is provided, the level adjustment permits quick matching of the differential pressure cell range to the liquid height, the fine adjustments are then made electrically. Level adjustment is accomplished in our example by connecting the overflow device to the calibrated conduit by an S-shaped curved metal tube. The curve makes the metal tube flexible enough to accommodate the small vertical changes in the level of the overflow device necessary to make level adjustment.

The liquid storage and bubble removing chamber 1, solenoid valve 2, heat exchanger 3, differential pressure measuring device 4, calibrated conduit 5, and overflow chamber 6 are all enclosed in the temperature regulating housing 7, which is filled with a heat conducting medium, to maintain these essential elements at constant temperature with conventional temperature regulating means.

The calibration procedure is carried out in the following steps:

(A) The liquid is all removed by draining, flushing and blowing dry with nitrogen gas.

(B) A gross change in the differential pressure cell zero adjustment is then made.

(C) Fine adjustments to secure a reading of 0.0000 with electrical range at maximum are made.

(D) A stream of liquid with a known density (e.g. benzene, S. G. 0.8790 at 20° C.) is allowed to flow through the entire device in the normal flow channels, while the temperature is adjusted and controlled at a predetermined constant level (e.g. 20° C. or 60° F.) with the heat exchanger and temperature regulation housing. If the flow rate is constant during this time, the indicated reading will reach and hold at some constant level when all the bubbles have been flushed out and the temperature has reached an equilibrium.

(E) The flow is stopped by closing the valve, the reading is allowed to reach some constant value, then is recorded, flow is started for a short time and then reading is repeated. Three consistent readings indicate that valid data are being obtained.

(F) If the reading is much too high or too low (e.g. 1.523 when 0.8790 is expected) a change in the range of the differential pressure cell is required. Assume this is done.

(G) Steps A through F are repeated; assume the reading is now 0.8671.

(H) The level adjustment on the overflow chamber is now used to raise that chamber (increase the liquid level) until a reading greater than 0.8790 is obtained (e.g., .8937).

(I) The electrical range adjustment (such as a potentiometer) is then removed from its maximum output setting where it has been up to this time, until the digital reading is at the desired value 0.8790.

(J) The linearity is then checked by repeating steps A, D and E using different liquids with different known densities. (Changes in interfacial tension create an error.)

(K) Experience has shown that if the zero reading (steps A, B and C) is checked weekly only small adjustments are required if any (e.g. ±.0005). The range adjustment rarely needs adjustment unless changes or repairs are made. Changes in operating temperature require only changes in zero adjustment in most cases, but range adjustment and linearity should be checked.

EXAMPLE

A specific example of the operation of the apparatus of our invention is as follows.

In a micro-scale pilot plant a light gas oil feed (specific gravity about 0.93) was passed through a reactor where some lighter products were made. After passing through a stabilizer (or debutanizer) the liquid product, at a flow rate of about 5.0 grams per hour, entered the density measuring apparatus which was located in a cabinet thermostated at 90° F. and in which air was recirculated as the heat transfer medium. The liquid storage and bubble removing chamber had an upper section about 1 inch in diameter and about 2½ inches long inclined about 45° from a horizontal position, attached to a lower section about ¼ inch inside diameter and 5 inches long in a vertical position. The bottom of liquid storage chamber was about at the same level as the overflow device. The tubbing and fittings from the bottom of this storage chamber to the overflow device had an inside diameter of 0.060 inch. The flow interrupting device was a miniature solenoid valve with a ³⁄₆₄-inch orifice located about 6 inches below the bottom of the storage chamber. The heat exchanger consisted of about 30 inches of 0.060 inch inside diameter stainless steel tubing located in the moving stream of thermostated air and entering the lower part of the differential pressure cell. The volume of the cell was about 2.0 to 2.5 milliliters. The calibrated conduit consisted of about 32 inches total length of 0.060 inch inside diameter stainless steel tubing connected to the overflow chamber. This chamber was made of glass with outside dimensions of about 1 inch by 3 inches. The liquid passage was of ¹⁄₁₆ inch inside diameter glass tubing extending up through the bottom to about the center of the larger tube. The liquid overflow was a ¼ inch I.D. glass funnel attached to the top of the small tube. The liquid flowed out of the overflow device via a ¼ inch inside diameter tube attached off center to the bottom of the larger chamber. The top of the large chamber and the top of the storage chamber were connected together and vented by a common line of ⅛ inch inside diameter tubing to the top of the stabilizer (debutanizer) column. This vent line contained a solenoid valve which was closed along with the solenoid in the liquid line prior to the time the normal readings were taken. The overflow level was about 25.5 inches above the center of the differential pressure cell.

The current signal (10 to 50 milliamps full scale) from the differential pressure cell passed through a 200 ohm resistor. The voltage across this resistor was opposed by a 2.0 volt constant voltage supply to compensate the zero reading signal; the corrected voltage was read through a 10-turn variable potentiometer by a digital voltmeter with a four digit output.

The stream composition varied with reactor conditions. Hourly readings with the flow stopped averaged 0.8680 specific gravity, with a range of readings from 0.8660 to 0.8710. The average agreed with a blend of four hours of product read by a glass hydrometer within 0.0020 specific gravity. Readings taken with the stream flowing varied from 0.8895 to 0.9450.

We claim:

1. An apparatus for measurement of density of a liquid stream of small volume flow rate, said apparatus having internal dimensions so small that a substantial pressure drop in a liquid flowing through the apparatus is caused by viscous drag, comprising:
    (a) an inclined conduit closed at its lower end and opened at its upper end having internal dimensions such that a substantial pressure drop in a flowing liquid is created across the conduit due to frictional drag of the flowing liquid, which pressure drop affects the accuracy of pressure measurement across the conduit,
    (b) means connected to the upper end of the conduit defining an overflow chamber therefor extending above and below the upper end of the conduit and providing a gas space above the upper end of the conduit,
    (c) means connected to a lower level of the conduit for introducing the liquid into the conduit to pass the liquid through the conduit overflowing into the overflow chamber at the upper end of the conduit,
    (d) means connected to the overflow chamber at a position below the upper end of the conduit for withdrawing liquid overflow from the chamber,
    (e) pressure measuring means connected to the conduit at a lower level therein, and connected to the overflow chamber above the upper end of the conduit for measuring the pressure difference between the gas pressure in the overflow chamber and the liquid pressure at such lower level in the conduit,
    (f) means defining a liquid receiving and storage chamber interconnected to the liquid introducing means connected to a lower level of the conduit, and
    (g) flow interrupting means operably positioned between the receiving and storage chamber and the liquid introducing means operable to stop flow of the liquid stream through the conduit so that the pressure difference can be measured under static conditions.

2. Apparatus as set forth in claim 1 including means for adjusting the effective liquid column height of the conduit.

3. Apparatus as set forth in claim 1 wherein the conduit has an inner diameter of less than about 0.25 inch.

4. Apparatus as set forth in claim 3 wherein the conduit has an inner diameter from about 0.02 to about 0.06 inch.

5. Apparatus as set forth in claim 1 wherein the volume flow rate of the liquid stream is less than about 1000 ml./hr. and the total internal volume of the apparatus is less than about 1000 ml.

6. Apparatus as set forth in claim 1 wherein the gas space above the conduit and the low pressure side of the differential pressure measuring means are vented to the atmosphere.

7. Apparatus as set forth in claim 1 including heat exchange means for maintaining the liquid stream at a constant predetermined temperature.

8. An apparatus for measurement of density of a liquid stream of small volume flow rate, said apparatus having internal dimensions so small that a substantial pressure drop in a liquid flowing through the apparatus is caused by viscous drag, comprising:
    (a) an inclined conduit closed at its lower end and opened at its upper end having an inner diameter from about 0.02 to about 0.06 inch,
    (b) means connected to the upper end of the conduit defining an overflow chamber therefor extending above and below the upper end of the conduit and providing a gas space above the upper end of the conduit,
    (c) means connected to a lower level of the conduit for introducing the liquid into the conduit to pass the liquid through the conduit overflowing into the overflow chamber at the upper end of the conduit,
    (d) means connected to the overflow chamber at a position below the upper end of the conduit for withdrawing liquid overflow from the chamber,
    (e) pressure measuring means connected to the conduit at a lower level therein, and connected to the overflow chamber above the upper end of the conduit for measuring the pressure difference between the gas pressure in the overflow chamber and the liquid pressure at such lower level in the conduit,
    (f) means defining a liquid receiving and storage chamber interconnected to the liquid introducing means connected to a lower level of the conduit, and
    (g) flow interrupting means operably positioned between the receiving and storage chamber and the liquid introducing means operable to stop flow of the liquid stream through the conduit so that the pressure difference can be measured under static conditions.

9. Apparatus as set forth in claim 8 wherein the volume flow rate of the liquid stream is less than about 1000 ml./hr. and the total internal volume of the apparatus is less than about 1000 ml.

10. Apparatus as set forth in claim 8 wherein the volume flow rate of the liquid stream whose density is to be measured is less than about 1000 ml./hr. and the total internal volume of the apparatus is less than about 500 ml.

References Cited

UNITED STATES PATENTS

| | | | |
|---|---|---|---|
| 3,190,126 | 6/1965 | Wright | 73—438 |
| 35,152 | 5/1862 | Hogg | 73—438 |
| 1,888,577 | 11/1932 | Stephens | 73—438 |
| 2,294,455 | 9/1942 | Haultain | 73—438 |

FOREIGN PATENTS 152,339  10/1965  Russia.

RICHARD C. QUEISSER, Primary Examiner

JOHN K. LUNSFORD, Assistant Examiner

U.S. Cl. X.R.

73—32, 299